United States Patent [19]

Minarczyk et al.

[11] Patent Number: 5,394,062
[45] Date of Patent: Feb. 28, 1995

[54] LAMP BALLAST CIRCUIT WITH OVERLOAD DETECTION AND BALLAST OPERABILITY INDICATION FEATURES

[75] Inventors: Michael M. Minarczyk; Louis R. Nerone, both of Brecksville; Joseph C. Oberle, Chagrin Falls; Brian M. Ronald, Hudson; Clarence J. Harsa, Broadview Heights; Edward J. Thomas, Streetsboro, all of Ohio

[73] Assignee: General Electric Company, Schenectady, N.Y.

[21] Appl. No.: 167,749

[22] Filed: Dec. 15, 1993

[51] Int. Cl.$^6$ ............................................. H01J 1/60
[52] U.S. Cl. ................. 315/129; 315/209 R; 315/224; 315/219; 315/DIG. 5
[58] Field of Search .......... 315/129, 219, 291, 209 R, 315/224, 244, DIG. 5, DIG. 7

[56] References Cited

U.S. PATENT DOCUMENTS

| | | | |
|---|---|---|---|
| 3,293,489 | 12/1966 | Marshall | 315/129 |
| 5,047,690 | 9/1991 | Nilsson | 315/224 |
| 5,134,345 | 7/1992 | El-Hamainsy et al. | 315/DIG. 7 X |
| 5,208,515 | 5/1993 | Lee | 315/219 X |
| 5,233,273 | 8/1993 | Waki et al. | 315/224 |

OTHER PUBLICATIONS

U.S. patent application Ser. No. 08/020,275, date filed: Feb. 18, 1993.

Primary Examiner—Robert J. Pascal
Assistant Examiner—Haissa Philogene
Attorney, Agent, or Firm—George E. Hawranko; Stanley C. Corwin

[57] ABSTRACT

A gas discharge lamp ballast with an indicator of operability of the ballast is disclosed. The ballast circuit comprises circuitry for providing a d.c. bus voltage on a bus conductor with respect to a ground, and a resonant load circuit. The resonant load circuit includes lamp terminals for connecting to a removable gas discharge lamp, a resonant inductor, and a resonant capacitor. The resonant inductor and resonant capacitor are selected to set a magnitude, and resonant frequency, of a bidirectional current in the lamp. Further included is a converter circuitry, including first and second serially connected switches coupled between the bus conductor and the ground, and providing to the resonant load circuit, at a node coupled between the first and second switches, a voltage that alternates between first and second voltage levels. Circuitry for generating first and second switch-control signals for alternately switching into conduction the first and second switches, including circuitry responsive to a feedback signal representing a current in the resonant load circuit, are further included. The ballast circuit, moreover, includes overload detection circuitry for detecting if voltage applied to the lamp terminals exceeds an overload level; and circuitry for indicating, in response to such an overload condition being detected by the overload detection circuitry, probable operability of the ballast circuit.

19 Claims, 5 Drawing Sheets

LAMP BALLAST CIRCUIT WITH OVERLOAD DETECTION AND BALLAST OPERABILITY INDICATION FEATURES

FIELD OF THE INVENTION

The present invention relates to a lamp ballast, or power supply, circuit for a gas discharge lamp, and, more particularly to such a ballast circuit that includes an indicator of ballast operability.

BACKGROUND OF THE INVENTION

An emerging class of compact gas discharge lamps employs a standard Edison-type screw base, for installation in a conventional lamp socket that can also accommodate incandescent lamps. Such compact gas discharge lamps comprise low pressure fluorescent lamps that employ a multi-axis envelope, or discharge vessel, in which light is emitted from a suitable fill that is electrically excited to a discharge state. The power supply, or as more conventionally known, "ballast" circuit for such a compact fluorescent lamp typically has an expected lifetime of four or more times that of the mentioned multi-axis envelope and any associated circuitry. It would, therefore, be desirable to provide a gas discharge lamp ballast circuit that includes an indicator of operability of the ballast circuit. In this way, the ballast circuit can be saved for re-use with a removable gas discharge lamp.

As the present inventors have discovered, an indicator of operability of a lamp ballast circuit can beneficially be coupled to the output of a circuit for sensing an overload condition of voltage on terminals for connecting to a lamp (hereinafter, "lamp terminals"). Such sensing circuitry is typically used with a shut-down circuit for terminating the supply of voltage to the lamp terminals. A typical prior art overload sensing circuit, however, suffers from the drawback of only detecting one of the positive or negative excursions of lamp voltage. Such circuit may, therefore, fail to sense excessive excursions of lamp voltage in the other polarity, wherein the lamp is operating in a so-called rectification mode; such mode may occur, for instance, where one of the lamp cathodes has become damaged. Continued operation of the lamp in a rectification mode places above-normal stress on the components of the ballast circuit, and thereby risks reduced ballast life.

It would, therefore, be desirable to provide a gas discharge lamp ballast circuit that includes a circuit for sensing an overload condition of voltage on the lamp terminals, including a rectification mode failure of the lamp.

A gas discharge lamp ballast circuit employing a prior art overload sense circuit, as described above, relates the use of a pair of switches that are alternately switched into a conduction state, for providing bidirectional current to a resonant load circuit including a gas discharge lamp. Control of the switches is typically provided by circuitry that supplies the control terminals, or "gates," of the switches with respective control signals derived from feedback of a current in the resonant load circuit. Control of the switch gates in this manner is known in the art as "self-resonant" gate control.

Typically, a prior art ballast circuit of the foregoing type will incorporate an overload sense circuit, as described above, and a responsive, shut-down circuit for terminating self-resonant gate control, and, hence, potentially damaging current in the switches. A drawback arises where such ballast circuit further uses a start-up circuit of the non-latching latching type for initiating self-resonant gate control by providing a start-up pulse to the gates of the switches. Owing to the non-latching nature of such start-up circuit, such circuit will, shortly after shut down of the switches in response to an overload condition, provide yet another start-up pulse, to thereby re-initiate self-resonant gate control. With an overload condition persisting, the shut-down circuit will again terminate the self-resonant gate control, but the non-latching start-up circuit then re-initiates the self-resonant gate control. This process repeatedly occurs, placing the components of the ballast circuit under abnormally high stress, thus shortening ballast life.

It would, therefore, be desirable to provide a gas discharge lamp ballast circuit that avoids the repeated stressing of ballast circuit components arising from repeated re-initiation of a self-resonant mode of gate control during an overload condition.

OBJECTS AND SUMMARY OF THE INVENTION

It is, accordingly, an object of the invention to provide a gas discharge lamp ballast circuit that includes an indicator of operability of the ballast circuit and further provides a circuit for sensing an overload condition of voltage on the lamp terminals, including a rectification mode failure of the lamp.

Another object of the invention is to provide a gas discharge lamp ballast circuit that avoids the repeated stressing of ballast circuit components arising from repeated re-initiation of a self-resonant mode of gate control during an overload condition.

In accordance with the invention, there is provided a gas discharge lamp ballast with an indicator of operability of the ballast. The ballast circuit comprises means for providing a d.c. bus voltage on a bus conductor with respect to a ground, and a resonant load circuit. The resonant load circuit includes lamp terminals for connecting to a removable gas discharge lamp, a resonant inductor, and a resonant capacitor. The resonant inductor and resonant capacitor are selected to set a magnitude, and resonant frequency, of a bidirectional current in the lamp. Further included is a converter means, including first and second serially connected switches coupled between the bus conductor and the ground, and providing to the resonant load circuit, at a node coupled between the first and second switches, a voltage that alternates between first and second voltage levels. Means for generating first and second switch-control signals for alternately switching into conduction the first and second switches, including means responsive to a feedback signal representing a current in the resonant load circuit, are further included. The ballast circuit, moreover, includes overload detection means for detecting if voltage applied to the lamp terminals exceeds an overload level; and means for indicating, in response to such an overload condition being detected by the overload detection means, probable operability of the ballast circuit.

BRIEF DESCRIPTION OF THE DRAWING FIGURES

The foregoing, and further, objects and advantages of the invention will become apparent from the following description taken in conjunction with the drawing, in which.

DETAILED DESCRIPTION OF THE PREFERRED EMBODIMENTS

Figure 1:
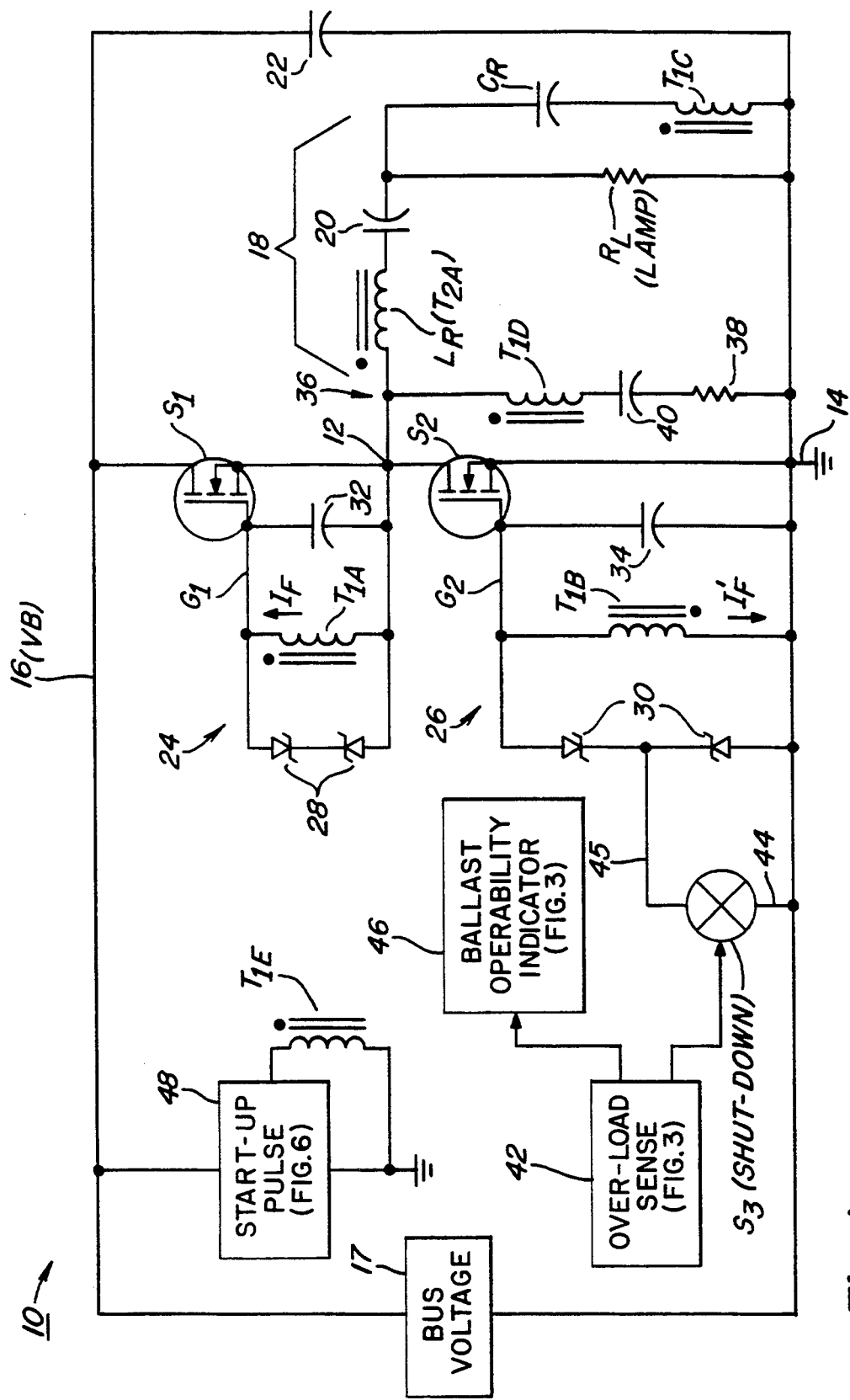
FIG. 1 is a schematic diagram, partially in block form, of a gas discharge lamp ballast circuit with an indicator of ballast operability, in accordance with the invention.

FIG. 1 is a schematic diagram, partially in block form, of a power supply, or "ballast," circuit for a gas discharge lamp. The lamp, which is situated at the lower right of the figure, is shown in simplified form as a resistance $R_L$. Lamp $R_L$ may comprise a low pressure fluorescent lamp, for instance, which may be either electroded or electrodeless. Bidirectional current is supplied to lamp $R_L$ through the alternate conduction of MOSFET, or other, switches $S_1$ and $S_2$, which alternately connect circuit node 12 to a ground 14, and to a bus conductor 16, having a d.c. bus voltage $V_B$ thereon. Bus voltage $V_B$ is provided by a source 17 of bus voltage, which, by way of example, may comprise a full-wave bridge rectifier, or a voltage-doubling circuit. Source 17 of bus voltage may also include, if desired, a standard power factor correction circuit.

Lamp $R_L$ is included in a resonant load circuit 18, which also includes a resonant capacitor $C_R$ shunted, or paralleled, across lamp $R_L$, for instance, and a resonant inductor $L_R$, which is then placed in series with the thus-paralleled lamp and resonant capacitor. The values of resonant capacitor $C_R$ and resonant inductor $L_R$ are chosen to set the magnitude, and resonant frequency, of bidirectional current through lamp $R_L$. Capacitors 20 and 22 also cooperate with the foregoing resonant load circuit, with capacitor 20 acting as a high-pass filter, for d.c. blocking purposes, and capacitor 22 acting as a low-pass filter, for removing a.c. signals from bus conductor 16.

Alternate conduction of switches $S_1$ and $S_2$ is achieved by respective gate circuits 24 and 26 that respectively provide control signals on gates $G_1$ and $G_2$ of switches $S_1$ and $S_2$. Gate circuits 24 and 26 are responsive to resonant current in resonant capacitor $C_R$ that is fed back to the gate circuits via a transformer winding $T_{1C}$. Such an arrangement achieves self-resonant gate control of switches $S_1$ and $S_2$, as described above in the "Background of the Invention." More specifically, current in transformer winding $T_{1C}$ generates respective feedback currents $I_F$ and $I_F'$ in respective transformer windings $T_{1A}$ and $T_{1B}$ of gate circuits 24 and 26. Feedback currents $I_F$ and $I_F'$ are oppositely directed, for achieving alternate switching on of switches $S_1$ and $S_2$. Respective Zener diode pairs 28 and 30 of gate circuits 24 and 26 clamp the voltage on switch gates $S_1$ and $G_2$, respectively, to a positive or a negative level with a timing determined by the polarity and amplitude of their respective feedback current $I_F$ or $I_F'$. Respective capacitors 32 and 34 of the gate circuits, in conjunction with the respective parasitic gate capacitances (not shown) of their associated switches $S_1$ or $S_2$, also influence the behavior of circuits 24 and 26. Further details of operation of gate circuits 24 and 26 are set forth in co-pending U.S. patent application Ser. No. 08/049,911 (attorney docket number LD 10524), filed Apr. 20, 1993, entitled "Power Supply Circuit for a Gas Discharge Lamp," by Louis R Nerone, one of the present inventors; such application is assigned to the present assignee.

Figure 2:
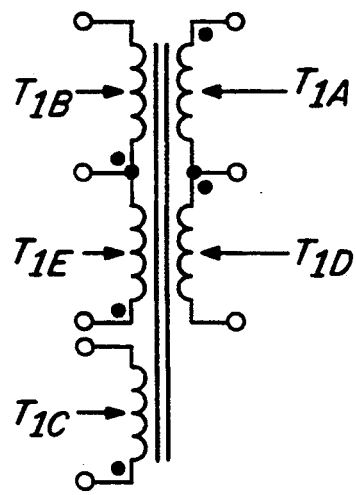
FIG. 2 is a schematic diagram of a transformer comprised of various windings used in the ballast circuit of FIG. 1.

FIG. 2 shows a preferred interconnection of transformer windings $T_{1A}$, of gate circuit 24, $T_{1B}$ of gate circuit 26, and $T_{1C}$ of resonant load circuit 18, with winding polarities shown by the associated solid dots appearing in FIGS. 1 and 2. With the various windings connected as shown in FIG. 1, it is beneficially possible in typical circuits for all but winding $T_{1A}$ to be wound on a common transformer core without special winding-to-winding insulation, followed by such winding $T_{1A}$ separated from the previous windings by tape-type insulation.

In parallel with resonant load circuit 18 is a snubber & gate speed-up circuit 36. Circuit 36 includes a resistor 38, a capacitor 40, and a transformer winding $T_{1D}$, connected together in a serial circuit. Transformer winding $T_{1D}$ is mutually coupled to each of transformer windings $T_{1A}$ and $T_{1B}$ in gate circuits 24 and 26, respectively, as further detailed in FIG. 2. Winding $T_{1D}$, moreover, is coupled to winding $T_{1C}$, which senses current through resonant capacitor $C_R$. Resistor 38 serves to reduce parasitic interaction between capacitor 40 and other reactances coupled to it.

In one mode of operation, capacitor 40 performs a so-called snubbing function, wherein it stores energy from resonant load circuit 18 during an interval in which one of switches $S_1$ and $S_2$ has turned off, but the other has not yet turned on. The energy stored in capacitor 40 is thereby diverted from switches $S_1$ and $S_2$, which, in the absence of snubbing capacitor 40, would dissipate such energy in the form of heat while switching between conductive and non-conductive states. Further details of the snubbing role of capacitor 40 are described in co-pending U.S. patent application Ser. No. 08/020,275 (attorney docket no. LD 10583), filed Feb. 18, 1993, entitled "Electronic Ballast Arrangement for a Compact Fluorescent Lamp," by Louis R. Nerone.

In a second mode of operation, capacitor 40 increases the speed of switching of switches $S_1$ and $S_2$, when such switches are embodied as MOSFETs. In this mode, capacitor 40 creates a speed-up pulse when a rising current therein, induced in winding $T_{1D}$, occurs. The rising current in winding $T_{1D}$ results from rising current in mutually coupled winding $T_{1C}$. Further details of this gate speed-up role of capacitor 40 are described in the above-mentioned U.S. patent application Ser. No. 08/020,275 of Louis R. Nerone.

Figure 3:
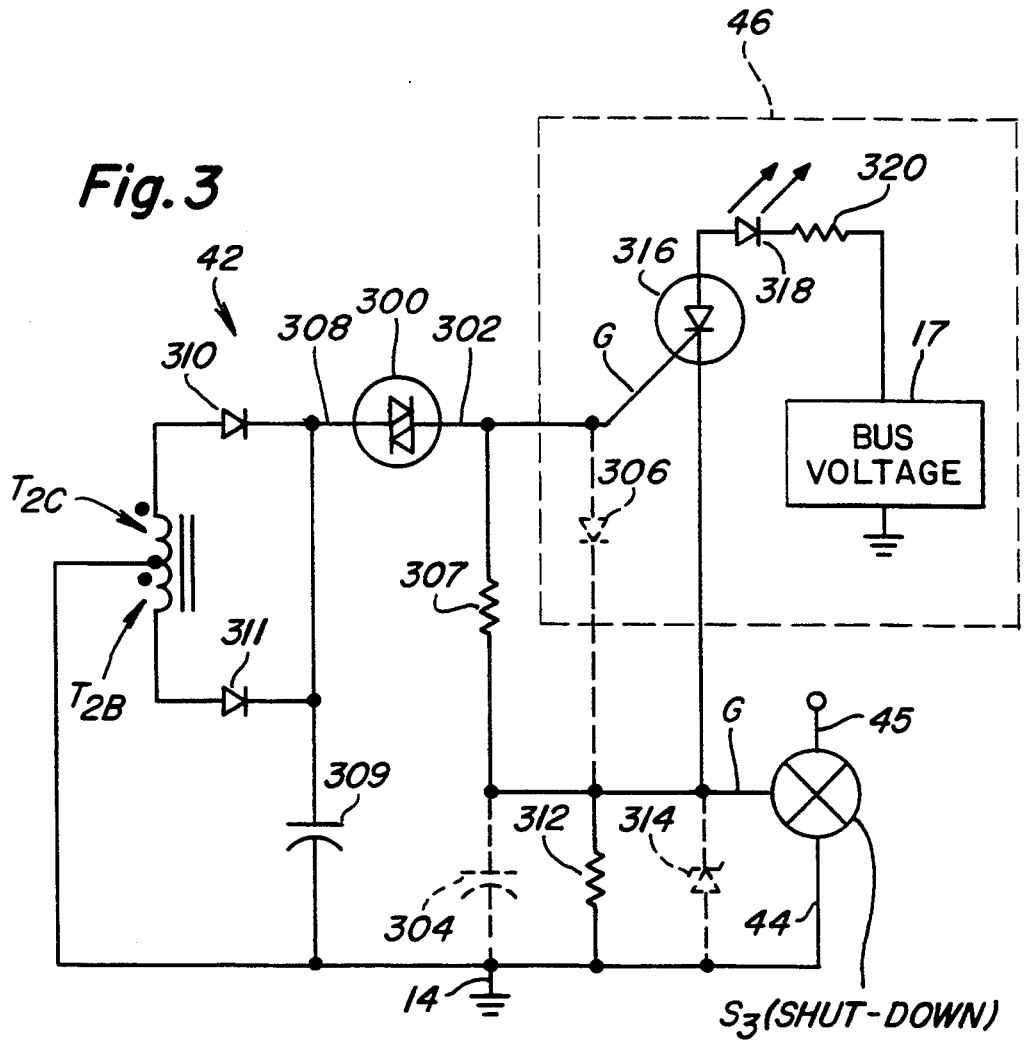
FIG. 3 is a schematic diagram of the overload sense, and operability indicator, circuits shown in block form in FIG. 1.

If lamp $R_L$ is removed, or does not turn on, the current through resonant inductor $L_R$, in resonant load circuit 18, will increase as the voltage across the lamp terminals increases. As more current is drawn through switches $S_1$ and $S_2$, to meet this condition, the switches become heated, and will typically fail within about 100 milliseconds, unless the self-resonant mode of operation of gate circuits 24 and 26 is stopped. Accordingly, as shown in FIG. 3, ballast circuit 10 includes circuitry 42 for sensing a voltage overload condition across the lamp terminals, and a shut-down switch $S_3$. In response to an overload condition being sensed by circuitry 42, shut-down switch $S_3$ clamps the voltage on gate $G_2$ to about 0.7 volts, for instance, for greater than $\frac{1}{2}$ of the period of resonance of resonant load circuit 18. With gate $G_2$ held to about 0.7 volts for such duration, bidirectional current through resonant load circuit 18 is terminated and no longer sensed in windings $T_{1A}$ and $T_{1B}$ of the gate circuits, thus ending the self-resonant mode of operation of the gate circuits. This stops current through switches $S_1$ and $S_2$, whereby such switches are prevented from failure through overheating.

With switch $S_3$ embodied as an n-channel MOSFET, for instance, and its drain terminal 44 connected to ground 14, source terminal 45 of switch $S_3$ may be connected, as shown, to the common node of Zener diode pair 30 of gate circuit 26, for shutting down switch $S_2$. In this manner, the parasitic drain-to-source diode of switch $S_3$ becomes isolated, by being paralleled to the lower-shown Zener diode of diode pair 30.

A ballast operability indicator 46 beneficially indicates to a user when a lamp failure, for instance, occurs whether the lamp ballast circuit is operable; if so, the ballast circuit can be saved for use with another gas discharge lamp. Ballast operability indicator 46 is triggered into operation in response to overload sense circuitry 42 sensing an overload of voltage on the lamp terminals. Further details of ballast operability indicator 46 are described below.

Turning now to FIG. 3, overload sense circuitry 42 and ballast operability indicator 46 are more fully described. Most of the components of ballast operability indicator 46 are shown within dashed-line box 46; the remainder of the FIG. 3 circuit mainly comprises overload sense circuitry 42, although, as will become apparent from the following description, circuits 42 and 46 (beneficially) share some components. A DIAC 300, a voltage-triggered, momentary switch, is used in overload sense circuitry 42. In the absence of an overload of lamp-terminal voltage being sensed, node 302 of DIAC 300 is at the potential of ground 14. This is because, in the absence of such an overload, capacitor 304 discharges to ground 14. Meanwhile, a voltage induced in either of transformer windings $T_{2B}$ or $T_{2C}$ is impressed on the other node 308 of DIAC 300, in the following manner.

Figure 4:
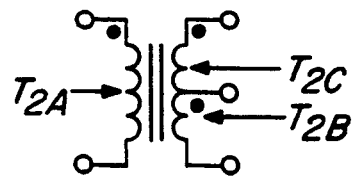
FIG. 4 is a schematic diagram of a transformer comprised of various windings used in the ballast circuit of FIG. 1 and overload sense circuit of FIG. 3.

As shown in FIG. 4, transformer windings $T_{2B}$ and $T_{2C}$ are coupled to winding $T_{2A}$. Winding $T_{2A}$ may conveniently be wound, as indicated in FIG. 1, on resonant inductor $L_R$, the current through which increases as the lamp-terminal voltage increases. Referring again to FIGS. 3 and 4, by connecting the center tap between windings $T_{2B}$ and $T_{2C}$ to ground 14, and connecting the respective, other ends of such windings via positively poled diodes 310 and 311, respectively, in a full-wave bridge configuration, to node 308 of the DIAC, an excessive excursion of lamp-terminal voltage in either a positive or negative direction is detected by overload sense circuitry 42. Capacitor 309 acts as a low pass filter to reduce the risk of spurious turn-on of DIAC 300.

When the voltage on node 308 of the DIAC exceeds the DIAC triggering level, e.g., 28–36 volts, DIAC 300 momentarily switches into a conducting mode, whereupon the other node 302 of the DIAC is momentarily brought, via the DIAC, to such triggering voltage level.

When node 302 is momentarily brought to the triggering level of DIAC 300, upon switching on of the DIAC, the internal p-n gate junction 306 of an SCR 316 becomes forward biased, causing capacitor 304 to rapidly increase in voltage. Current is also supplied to capacitor 304 via resistor 307, which reduces the sensitivity of SCR 316 to spurious turn-on. The voltage on gate G of shut-down switch $S_3$ begins to decay through discharge of capacitor 304, shown in dashed lines, to ground 14. The value of capacitor 304 and of parallel resistor 312 are chosen to maintain conduction of shut-down switch $S_3$ for more than $\frac{1}{2}$ of the period of resonance of bidirectional current in resonant load circuit 18 (FIG. 1). Such amount of time is required to assure the stopping of self-resonant gate control, and of the resulting bidirectional current in the resonant load circuit.

Zener diode 314, shown in dashed lines, becomes forward biased when SCR 316 is triggered into conduction, and continues to forward bias switch $S_3$ so long as SCR 316 is supplied with power from source 17 of bus voltage. This is true where switch $S_3$ comprises, for instance, either a MOSFET or a bipolar transistor. Zener diode 314 also limits the voltage applied to the gate G of shut-down switch $S_3$; this protects the gate from over voltage failure where switch $S_3$ comprises a MOSFET.

Where switch $S_3$ comprises a bipolar transistor, capacitor 304 and Zener 314 may, beneficially, be omitted; thus they are shown in dashed lines. Since resistor 312 then serves as a so-called "base" resistor, its value would typically be 1 k ohms, for the exemplary component values mentioned below. The term "gate" G, of switch $S_3$, for instance, is intended to signify a control terminal of a switch, such as a "gate" of a MOSFET, or the "base" terminal of a bipolar device.

The ability of overload sense circuitry 42 to sense either a positive, or a negative, overload of lamp-terminal voltage is believed to be a departure from the prior art. Such ability of circuitry 42 makes it possible to sense a failure mode of a gas discharge lamp known as a rectification mode, which may occur, for instance, where one of the lamp cathodes has become damaged. Continued operation of the lamp in a rectification mode places above-normal stress on the components of the ballast circuit, and thereby risks reduced ballast life.

Other circuitry for sensing a lamp-terminal voltage overload condition will be apparent to those skilled in the art, and could comprise, for instance, a resistor (not shown) placed between node 12 and resonant inductor $L_R$. The voltage across such a resistor indicates the level of current through the resonant inductor, which increases with increasing lamp-terminal voltage.

In accordance with another aspect of the invention, ballast operability indicator circuit 46 cooperates with overload sense circuitry 42, to produce an indication of operability of ballast circuit 10 (FIG. 1). Thus, when DIAC 300 of overload sense circuitry 42 is triggered into conduction, SCR 316 is also triggered into conduction, as described above. As a result, a light-emitting diode (LED) 318 is supplied with current via resistor 320, from source 17 of bus voltage, to cause the LED to emit light. As long as source 17 of bus voltage continues to supply current to LED 318, the LED continues to emit light. This is made possible through the use of SCR 316, which remains in a conducting state, since it is a latching-type device.

Figure 3A:
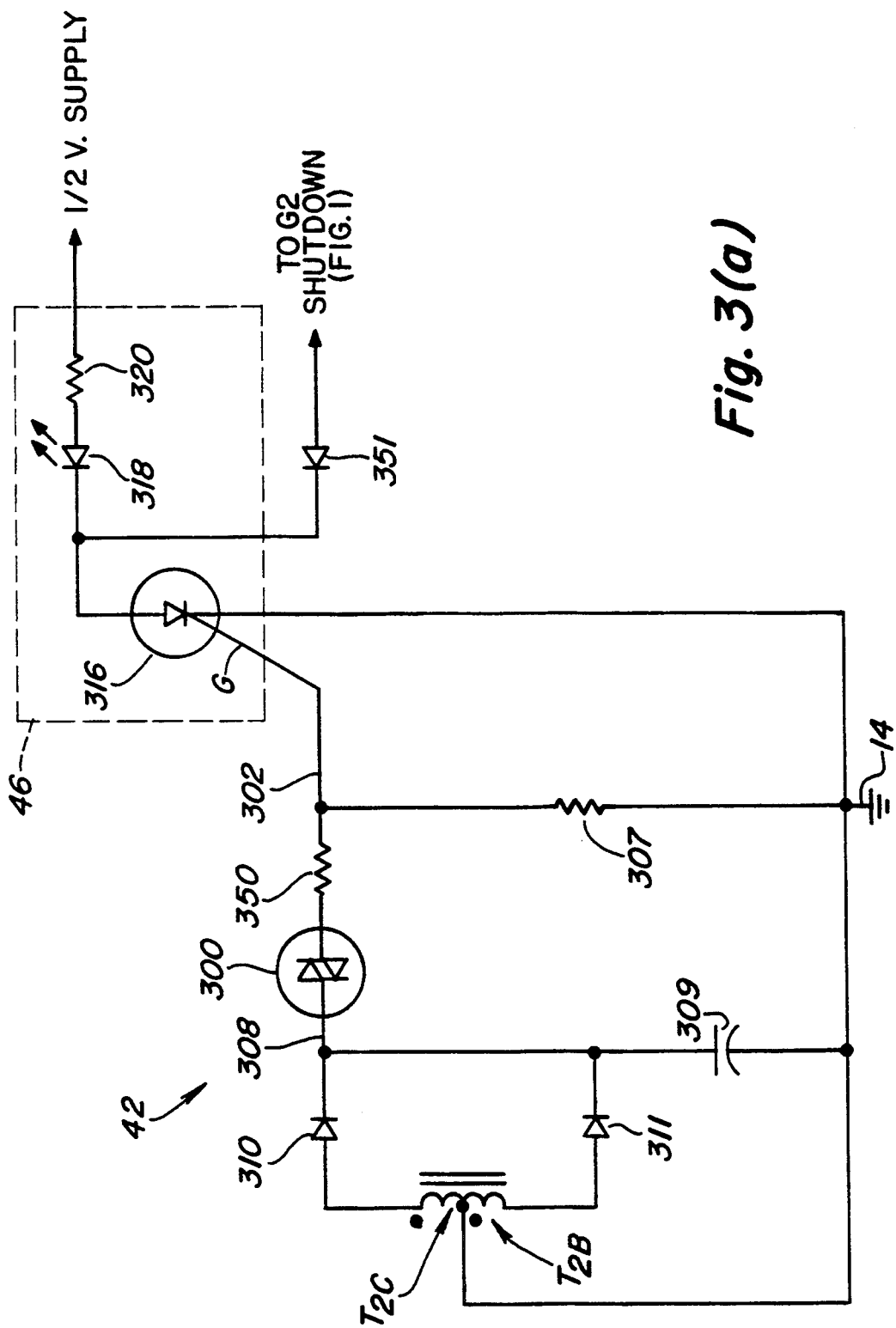
FIG. 3a is a schematic diagram of an alternate preferred arrangement for the overload sense and operability indicator circuits shown in block form in FIG. 1.

As seen in FIG. 3a, an alternate arrangement for achieving the overload protection as described in FIG. 3, yet in more cost effective manner and using a lesser number of components is provided. The front end portion of the overload sense circuit 42 of FIG. 3 is repeated in FIG. 3a and includes the transformer windings $T_{2B}$ and $T_{2C}$, positively poled diodes 310 and 311, DIAC 300 and filter capacitor 309. However, whereas the overload sense circuit 42 of FIG. 3 utilized a separate shutdown switch $S_3$ and associated components resistor 312 and zener diode 314, the circuit of FIG. 3a utilizes SCR 316 in a manner to perform the dual functions of providing a latching switch to turn on LED 318 as well as shutting down converter circuit portions 24, 26 shown in FIG. 1.

In operation, windings $T_{2B}$ and $T_{2C}$ sense the voltage across resonant inductor $L_R$. Diodes 310 and 311 form a full wave rectifier and charge capacitor 309 to peak voltage as a function of the turns ratio of transformer $T_2$. When capacitor 309 exceeds the breakdown voltage of DIAC 300, DIAC 300 will conduct thus discharging capacitor 309 into resistors 307 and 350 which form a gate voltage divider arrangement for SCR 316. In this arrangement, resistor 307 acts to limit the peak current delivered by capacitor 309 when discharging through DIAC 300 into the gate input of SCR 316. Resistor 350 functions in a similar current limiting manner and also reduces the regenerative gain of SCR 316 as well as increasing the noise immunity of the gate input of SCR 316. In the present embodiment, diode 351 is a 400 volt, 1 amp, high speed diode having a 250 nanosecond recovery time rating. Diode 351 is connected between the anode of SCR 316 and the gate input G2 associated with switching device S2 shown in FIG. 1. This diode 351 serves to isolate gate G2 of switch S2 from the voltage available on the cathode of LED 318, while also allowing gate G2 of switch S2 to be pulled down during a shutdown condition.

When a shutdown does occur, SCR 316 is gated on via the conduction of DIAC 300. SCR 316 then conducts anode to cathode and allows two currents to flow; these being: a typical DC from the supply through resistor 320 and LED 318, and, current from gate node of switch S2. Since current is pulled from the gate node of switch S2, switch S2 cannot turn on thereby stopping resonant operation. SCR 316 will stay latched on due to regenerative effects until the supply can no longer support the latching current rating of SCR 316. The latching current rating of the SCR is of a sufficient duration that the time period that the SCR 316 will remain latched is significantly greater than the period of the converter arrangement thereby insuring that the shutdown of the gate current to switch S2 will occur before the SCR 316 unlatches. In this manner, it can be appreciated that the shutdown of the converter is accomplished using the same components as are utilized for operating the operability LED 318. Moreover, this revised implementation also reduces the dissipation of resistor 320 while the shutdown circuit and operability LED 318 are functioning. The voltage source for powering the operability LED 318 is the midpoint of the voltage doubler taken from a node 710 as illustrated and described in FIG. 7 and which corresponds to approximately one-half of the bus voltage. For a given current rating such as the SCR 316 holding current, use of this voltage results in a reduction of the dissipation as compared to a situation where the original bus voltage is utilized. This reduced dissipation feature would be equally effective when utilized in conjunction with the overload sensing circuit 42 shown in FIG. 3.

A user of the gas discharge lamp of ballast circuit 10 of FIG. 1 can beneficially interpret light from LED 318 of operability indicator circuit 46, as follows. The gas discharge lamp preferably comprises a two-part assembly, as shown in simplified form in FIG 5. A base section 500 includes an Edison-type screw base 502, a mechanical-alignment opening 504, and a set 506 of four electrical receptacle openings. The second, removable portion 510 of the lamp includes a multi-axis gas discharge lamp 512, such as a low pressure fluorescent lamp, a mechanical-alignment projection 514, and a set 516 of four projecting electrical terminals 516. A user attaches removable portion 510 to base portion 500 of the lamp by inserting mechanical-alignment projection 514 of the removable section into mechanical-alignment receptacle 504 of the base portion; such attachment is indicated by directional arrowheads on dashed line 518. Projecting electrical terminals 516 of the removable lamp section are then received within corresponding receptacle openings 506 in the base portion. The use of four terminals 516 from a fluorescent lamp 512 is customary where the lamp includes resistively heated cathodes.

Figure 5:
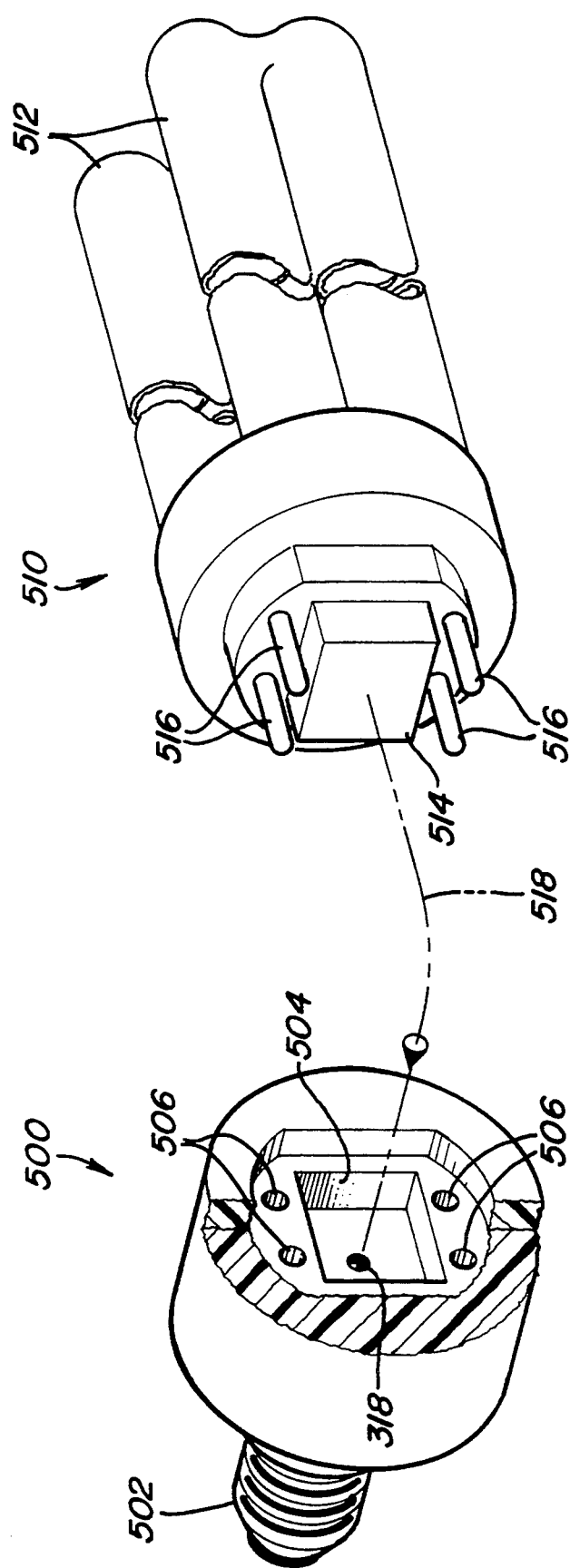
FIG. 5 is a simplified, perspective view of a two-part gas discharge lamp, showing an indicator of lamp ballast operability that is out of view when the two parts of the lamp are coupled together.

As shown in FIG. 5, LED 318 located at the bottom of mechanical-alignment opening 504; it is thus out of view during normal lamp operation when removable portion 510 is connected to base portion 500. A user, who notices that the removable lamp portion 510 no longer lights, would disconnect the source of power to base portion 500 for a predetermined length of time, typically on the order of ten seconds, during which time overload sense circuitry 42 (FIGS. 1 and 3) resets itself. Removable lamp portion 510 is then separated from base portion 500, preferably while base portion 500 is not powered. When power is restored to base portion 500, with removable portion 510 already separated from the base portion, the presence of light from LED 318 indicates that the ballast circuitry contained in base portion 500 is operational. Normal lamp operation is then restored by replacing removable lamp portion 510 with a functioning lamp portion. If, on the other hand, LED 318 fails to emit light at this time, then the ballast circuitry within base portion 500 has failed, assuming that the base portion is properly energized at its Edison-type screw base.

Figure 6:
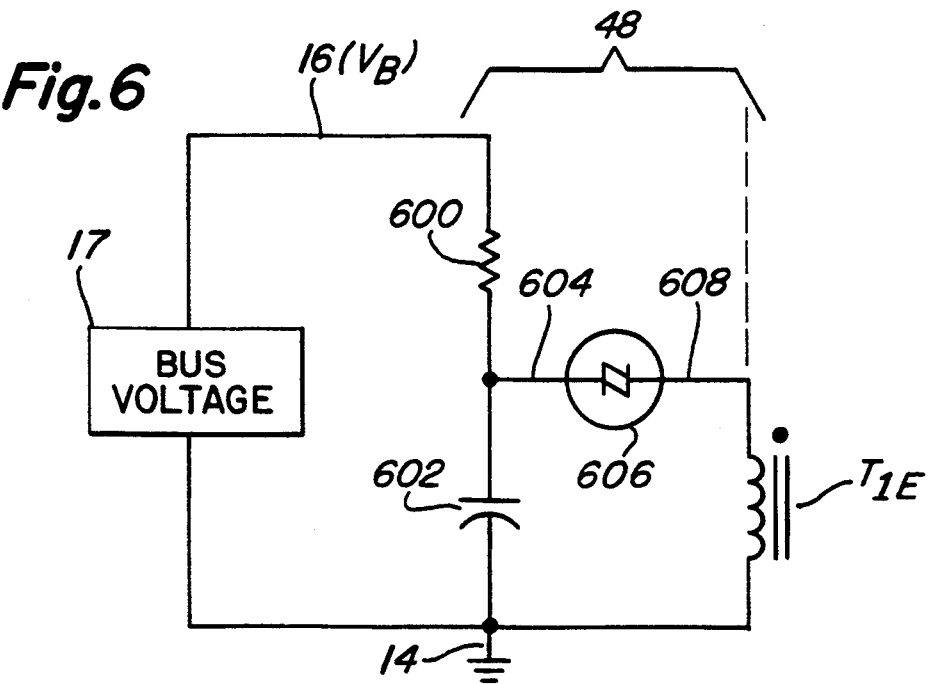
FIG. 6 is a schematic diagram of the start-up pulse circuit shown in block form in FIG. 1, together with an associated transformer winding.

FIG. 1 further shows a start-up pulse circuit 48, for generating a start-up pulse in transformer winding $T_{1E}$, which is coupled to windings $T_{1A}$ and $T_{1B}$ of gate circuits 24 and 26. Such a start-up pulse initiates self-resonant operation of gate circuits 24 and 26. FIG. 6 illustrates a preferred start-up circuit 48. In FIG. 6, when source 17 of bus voltage is energized, the series combination of a resistor 600 and capacitor 602 provides a portion of bus voltage $V_B$ voltage on node 604 of a Bilateral Silicon Triggered Switch (STS) 606, such as sold, for instance, by Teccor Electronics Inc. of Irving, Tex. With a relatively lower voltage existing on node 608 of STS 606, the STS is voltage-triggered into conduction, and provides a pulse of current through transformer winding $T_{1E}$, which is coupled to respective transformer windings $T_{1A}$ and $T_{1B}$ of gate circuits 24 and 26 (FIG. 1), as further detailed in FIG. 2. With windings $T_{1A}$ and $T_{1B}$ of the gate circuits having more turns than transformer $T_{1E}$ at the output of start-up pulse circuit 48, an amplified voltage pulse is applied to the respective gate circuits, to more assuredly initiate the alternate switching of switches $S_1$ and $S_2$.

STS 606, beneficially, is a latching-type device. Start-up pulse circuit 48, therefore, provides only a single start-up pulse as long as source 17 of bus voltage is continuously energized. In prior art circuitry, in contrast, a non-latching device, such as a SIDAC has been used in a start-up pulse circuit. A problem arises because such prior art non-latching start-up pulse circuit can yield a plurality of start-up pulses. When such non-latching start-up pulse circuit is used in conjunction with a overload shut-down circuit, then shortly after an overload-initiated shutdown, the non-latching start-up pulse circuit re-initiates conduction of the main ballast switches (i.e., $S_1$ and $S_2$). With an overload condition persisting, the shut-down circuit then terminates oscillation of such switches. This cycle repeats, with the non-latching start-up pulse circuit again re-initiating conduction of the main switches. Such repeated re-triggering of the main ballast switches, during an overload condition, repeatedly stresses the components of the ballast circuit, and prematurely shortens ballast life. This problem is avoided by the use of start-up pulse circuit 48 incorporating a latching-type device, such as STS 606.

Figure 7:
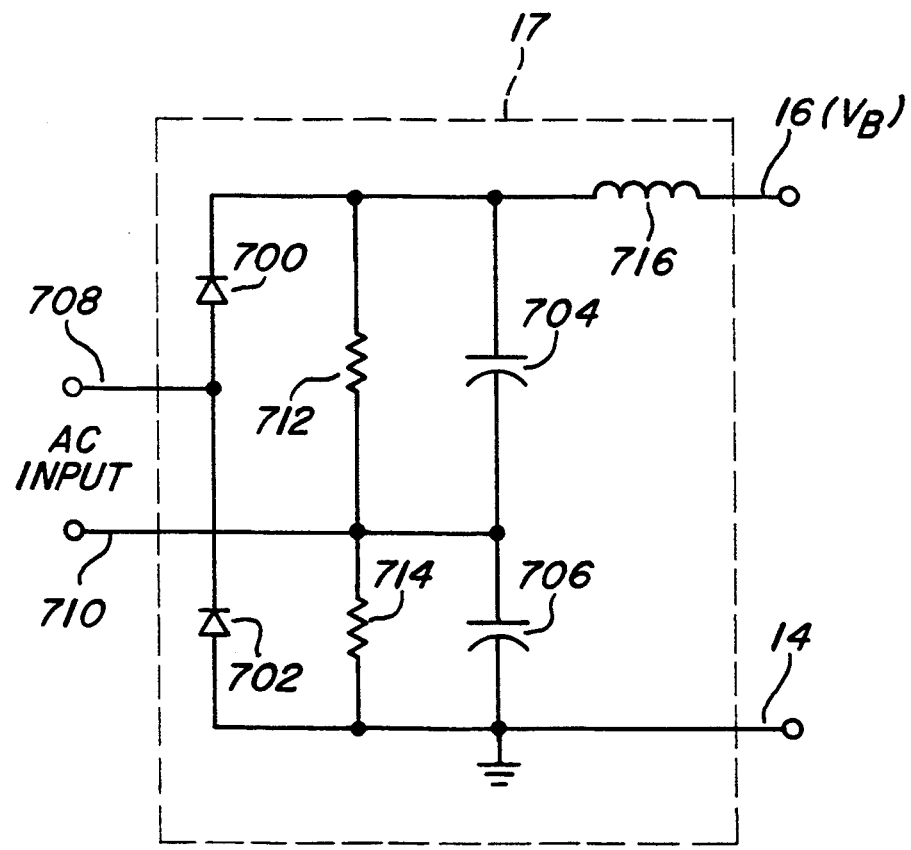
FIG. 7 is a schematic diagram of one particular source of bus voltage shown in block form in FIG. 1.

In order to permit start-up circuit 48 to re-initiate normal switching of the main ballast switches $S_1$ and $S_2$, bus voltage $V_B$, provided by source 17 of bus voltage, falls to a sufficiently low value to allow STS 606 to resume a non-conducting state. Such falling of bus voltage $V_B$ should occur within a reasonably short period of time, considering user convenience, typically on the order of 10 seconds. FIG. 7 shows source 17 of bus voltage embodied as a voltage-doubler circuit, which utilizes p-n diodes 700 and 702 coupled as shown to capacitors 704 and 706. Thus, a.c. voltage received between input terminal 708 and 710 is approximately doubled through the foregoing coupling action in a manner that is conventional per se. Resistors 712 and 714, which respectively shunt capacitor 704 and 706, are chosen to allow the voltage on such capacitors to decay to a low level in the mentioned period of time (e.g., about 10 seconds), after the source of a.c. power is cut off from input terminals 708 and 710. Typically, an electromagnetic interference (EMI) filter 716 will be provided to prevent EMI from the ballast circuitry, connected to the right (see FIG. 1), from passing to the a.c. line, connected to the left.

An exemplary embodiment of the invention uses the following component values, with reference to the above-described circuit diagrams, for a low pressure fluorescent lamp in the wattage range of 10 to 18, drawing a current of about 200 milli-amps: switches $S_1$ and $S_2$, MOSFETs with a designation IRFR310 by the Joint Electronic Device Engineering Council (JEDEC); switch $S_3$, a MOSFET with a JEDEC designation of 2N7002; the upper-shown diode of Zener diode pairs 28 and 30, each 10 volts; the lower-shown diode of Zener diode pairs 28 and 30, each 7.5 volts; capacitor 32, 1.2 nanofarads; capacitor 34, 1.2 nanofarads; resistor 38, 22 ohms; capacitor 40, 470 picofarads; resonant inductor $L_R$, 1.3 millihenries; capacitor 20, 0.044 microfarads; resonant capacitor $C_R$, 2.2 nanofarads; DIAC 300, 28–36 volts switch-on voltage; capacitor 304, 0.1 microfarads; capacitor 309, 0.1 microfarads; resistor 312, 75 k ohms; Zener diode 314, 10 volts; resistor 307, 1 k ohms; SCR 316, 400 volts; resistor 320, 56 k ohms; resistor 600, 280 ohms; capacitor 602, 0.22 microfarads; STS 606, 8–12 volts switch-on voltage; resistor 712, 150 k ohms; resistor 714, 150 k ohms; capacitor 704, 22 microfarads; capacitor 706, 22 microfarads; EMI filter 716, 820 microhenries; and transformer winding ratios $T_{1A}/T_{1B}$ of 1.0, $T_{1A}/T_{1C}$ of 3.0, $T_{1A}/T_{1D}$ of 5.0, $T_{1A}/T_{1D}$ of 45.0, $T_{2A}/T_{2B}$ of 27.5, and $T_{2A}/T_{2C}$ of 27.5.

From the foregoing, it will be realized that the invention provides a gas discharge lamp having various beneficial features. One feature is the inclusion of an indicator of operability of the ballast circuit. Another feature is the inclusion of a circuit for sensing an overload condition of voltage on the lamp terminals, including a rectification mode failure of the lamp. A still further feature is the avoidance of repeated stressing of ballast circuit components arising from repeated re-initiation of a self-resonant mode of gate control during an overload condition.

While the invention has been described with respect to specific embodiments by way of illustration, many modifications and changes will occur to those skilled in the art. It is therefore, to be understood that the appended claims are intended to cover all such modifications and changes as fall within the true spirit scope and scope of the invention.

What is claimed is:

1. A gas discharge lamp ballast circuit with an indicator of operability of the ballast circuit, said ballast circuit comprising:
    (a) means for providing a d.c. bus voltage on a bus conductor with respect to a ground;
    (b) a resonant load circuit including lamp terminals for connecting to a removable gas discharge lamp, a resonant inductor, and a resonant capacitor; said a resonant inductor, and a resonant capacitor; said resonant inductor and resonant capacitor being selected to set a magnitude, and resonant frequency, of a bidirectional current in the lamp;
    (c) converter means including first and second serially connected switches coupled between said bus conductor and said ground, and providing to said resonant load circuit, at a node coupled between said first and second switches, a voltage that alternates between first and second voltage levels;
    (d) means for generating first and second switch-control signals for alternately switching into conduction said first and second switches, including means responsive to a feedback signal representing a current in said resonant load circuit;
    (e) overload detection means for detecting if voltage applied to said lamp terminals exceeds an overload level;
    (f) means for indicating, in response to an overload condition being detected by said overload detection means, operability of the ballast circuit;
    (g) wherein said overload detection circuit detects if any of the positive and negative excursions of voltage applied to said lamp terminals exceeds an overload level; and
    (h) wherein said overload detection circuit includes a first transformer winding coupled to detect current through said resonant load circuit, a second transformer winding, mutually coupled to said first transformer winding, and having an intermediate tap connected to said ground, and a full-wave rectifier coupled across respective ends of said second transformer winding.

2. The gas discharge lamp ballast circuit of claim 1, wherein said indicating member provides a visual indication of an overload condition, said visual indication member being out of view when the lamp is connected to the lamp ballast circuit in a normal position for lamp operation.

3. The gas discharge lamp ballast circuit of claim 1, wherein said indicating member provides a prolonged indication of an overload condition being sensed, at least on the order of 10 seconds.

4. The gas discharge lamp ballast circuit of claim 1, further comprising a latch circuit coupled to said overload detection circuit and effective so as to latch said indicator member into an active condition.

5. The gas discharge lamp ballast circuit of claim 4, wherein said latch circuit comprises a silicon-controlled rectifier in series with said indicating member, said indicating member being powered when said rectifier is in a conductive state; a control gate of said silicon-controlled rectifier being coupled to said overload detection circuit in such manner that said silicon-controlled rectifier is switched into a conducting state when an overload condition is detected.

6. The gas discharge lamp ballast circuit of claim 1, in combination with the discharge lamp.

7. The gas discharge lamp ballast circuit of claim 1, further comprising a disabling circuit effective so as to disable current conduction through said first and second switches in response to an overload condition being detected.

8. The gas discharge lamp ballast circuit of claim 1, further comprising
   (a) a starter circuit coupled to said converter circuit arrangement and effective so as to generate a pulse to start conduction of one of said first and second switches, thereby commencing alternate switching of said first and second switches;
   (b) said starter circuit includes an electrical switch coupled between said bus conductor and ground for being switched into a conducting state whenever said bus conductor is initially brought to a rated bus voltage; and
   (c) said electrical switch of said starter circuit comprising a latch-type switch that remains conducting until the bus voltage falls substantially towards the potential of said ground.

9. The gas discharge lamp ballast circuit of claim 8, further comprising means for reducing said d.c. bus voltage towards the potential of said ground within about the order of 10 seconds after power to said reducing means has been terminated such that said latch-type switch can reset itself during a non-conducting state.

10. The gas discharge lamp ballast circuit of claim 8, wherein said starter circuit further includes a voltage-enhancing, transformer coupling to one of said first and second switches, so as to generate a more reliable start pulse for commencing alternate switching of said first and second switches.

11. The gas discharge lamp ballast circuit of claim 7 further comprising a latch circuit coupled to said overload detection circuit and effective so as to latch said indicator member into an active condition, said latch circuit including a silicon controlled rectifier coupled to said indicator member so as to control the operation thereof, Said silicon-controlled rectifier further being coupled to said converter circuit arrangement and being effective so as to disable said converter circuit arrangement upon the occurrence of an overload condition.

12. A ballast circuit arrangement for a gas discharge lamp comprising:
   (a) a source of power effective so as to provide a d.c. bus voltage on a bus conductor relative to ground;
   (b) a resonant load circuit including a resonant inductor and a resonant capacitor, said resonant inductor and resonant capacitor being selected so as to establish a magnitude and resonant frequency of a bi-directional current to said discharge lamp;
   (c) a converter circuit arrangement including first and second serially connected switches coupled between said bus conductor and ground and having a node formed therebetween and wherein said resonant load circuit is coupled to said converter circuit through said node, said converter circuit being effective so as to provide at said node, a voltage that alternates between first and second voltage levels;
   (d) a control circuit arrangement coupled to said converter circuit arrangement and responsive to feedback signal representing a current in said resonant load circuit, said control circuit arrangement being effective so as to generate first and second control signals which alternately switch said first and second switches into conduction;
   (e) a starter circuit arrangement coupled to said converter circuit arrangement and being effective so as to generate a pulse to start conduction of one of said first and second switches, said starter circuit arrangement including an electrical switch coupled between said d.c. bus conductor and ground and being effective so as to switch into a conducting state whenever said bus conductor is initially brought to a rated bus voltage; and
   (f) wherein said electrical switch is a latch-type switch that remains conducting until such time as said bus voltage falls substantially towards the potential of ground.

13. A ballast circuit arrangement as set forth in claim 12 further comprising a switch disabling circuit effective so as to disable current conduction through said first and second switches in response to an overload condition being detected.

14. A ballast circuit arrangement as set forth in claim 12, further comprising means for reducing said d.c. bus voltage towards the potential of said ground within about the order of 10 seconds after power to said reducing means has been terminated such that said latch-type switch can reset itself during a non-conducting state.

15. A ballast circuit arrangement as set forth in claim 12, wherein said starter circuit further includes a voltage-enhancing, transformer coupling to one of said first and second switches, so as to generate a more reliable start pulse for commencing alternate switching of said first and second switches.

16. A ballast circuit arrangement as set forth in claim 12 wherein said discharge lamp is a compact fluorescent lamp and said ballast circuit arrangement is disposed within a housing base separable from said discharge lamp.

17. A ballast circuit arrangement as set forth in claim 16 further comprising an overload detection circuit responsive upon detection of a voltage condition sensed across terminals associated with said discharge lamp, so as to generate an overload signal, and an indicator member receptive of said overload signal and effective so as to indicate probable operability of said ballast circuit thereby.

18. A ballast circuit arrangement as set forth in claim 17, further comprising a latch circuit coupled to said overload detection circuit and effective so as to latch said indicator member into an active condition.

19. A ballast circuit arrangement as set forth in claim 18, wherein said latch circuit comprises a silicon-controlled rectifier in series with said indicating member, said indicating member being powered when said rectifier is in a conductive state; a control gate of said silicon-controlled rectifier being coupled to said overload detection circuit in such manner that said silicon-controlled rectifier is switched into a conducting state when an overload condition is detected.

* * * * *